(12) United States Patent
Dow et al.

(10) Patent No.: US 8,752,115 B2
(45) Date of Patent: Jun. 10, 2014

(54) SYSTEM AND METHOD FOR AGGREGATING COMMERCIAL NAVIGATION INFORMATION

(75) Inventors: Christopher Dow, Palo Alto, CA (US); Philippe Pignon, Palo Alto, CA (US)

(73) Assignee: The DIRECTV Group, Inc., El Segundo, CA (US)

(*) Notice: Subject to any disclaimer, the term of this patent is extended or adjusted under 35 U.S.C. 154(b) by 0 days.

(21) Appl. No.: 10/396,230

(22) Filed: Mar. 24, 2003
(Under 37 CFR 1.47)

(65) Prior Publication Data
US 2004/0190853 A1    Sep. 30, 2004

(51) Int. Cl.
*H04N 7/173*    (2011.01)
*H04N 9/80*    (2006.01)

(52) U.S. Cl.
USPC ............................ 725/132; 386/249

(58) Field of Classification Search
USPC ......................................................... 725/132
See application file for complete search history.

(56) References Cited

U.S. PATENT DOCUMENTS

| | | | |
|---|---|---|---|
| 5,485,219 A | 1/1996 | Woo | |
| 5,532,735 A | 7/1996 | Blahut et al. | |
| 5,598,523 A * | 1/1997 | Fujita | 715/840 |
| 5,692,093 A | 11/1997 | Iggulden et al. | |
| 5,724,472 A | 3/1998 | Abecassis | |
| 5,892,536 A | 4/1999 | Logan et al. | 348/13 |
| 5,986,692 A | 11/1999 | Logan et al. | 348/13 |
| 6,177,931 B1 | 1/2001 | Alexander et al. | |
| 6,226,444 B1 * | 5/2001 | Goldschmidt Iki et al. | 386/83 |
| 7,143,353 B2 | 11/2006 | McGee et al. | |
| 2001/0014891 A1 | 8/2001 | Hoffert et al. | |
| 2002/0065678 A1 | 5/2002 | Peliotis et al. | |
| 2002/0083459 A1 * | 6/2002 | Kondo et al. | 725/88 |
| 2002/0144294 A1 * | 10/2002 | Rabinowitz et al. | 725/139 |
| 2003/0093790 A1 * | 5/2003 | Logan et al. | 725/38 |
| 2003/0126598 A1 * | 7/2003 | Agnihotri et al. | 725/32 |
| 2003/0167473 A1 * | 9/2003 | Klosterman et al. | 725/140 |
| 2004/0045020 A1 * | 3/2004 | Witt et al. | 725/13 |

OTHER PUBLICATIONS

Gotuit Video Slide Show, http://www.gotuit.com/slides/slide1.htm., printed Jun. 13, 2002.
International Search Report and Written Opinion, PCT/US04/08891, Dated Jul. 25, 2008.
International Search Report, PCT/US04/08632, Dated May 15, 2007.

* cited by examiner

*Primary Examiner* — Jason K Lin
(74) *Attorney, Agent, or Firm* — McDonnell Boehnen Hulbert & Berghoff LLP

(57) ABSTRACT

The present invention provides for gathering and aggregating data related to the functionality of digital video recorders (DVRs) and transmitting updated instructions to the DVRs. During its operation, a DVR gathers data that is relevant to the detection of commercials such as luminance values, commercial patterns, and user input and stores this information in its internal storage. A central server receives updated instructions from administrators and generates new instructions in response to data aggregated from individual DVRs. The central server transmits the updated instructions to remote DVRs.

19 Claims, 7 Drawing Sheets

SYSTEM AND METHOD FOR AGGREGATING COMMERCIAL NAVIGATION INFORMATION

BACKGROUND OF THE INVENTION

1. Field of the Invention

The invention relates to the field of video recorder systems and, more specifically, systems and methods for generating and updating instructions for digital video recorders.

2. Description of the Related Art

Video recorder technology, such as videocassette recorders (VCRs) and digital video recorders (DVRs), have increased consumer control over how and when consumers view video programming. Since the advent of VCRs, consumers have been able to record broadcast video (e.g., television, cable, and satellite broadcasts) for later viewing. A video program is recorded onto a storage medium, such as a videocassette. The users can then view the program from the videocassette at their leisure. VCRs also provide navigation features for viewing the stored programs. VCRs typically allow users to pause, fast forward, and rewind through portions of the program, with or without viewing them. Some VCRs offer added navigational features, such as slow motion and variable speed fast forward and rewind, though the quality of these features is limited by the analog technology involved. Consumers viewing a recorded program can use the fast forward feature to advance quickly through content that they do not wish to view. A common use of this feature has become skipping commercials in recorded programs.

Recognizing that consumers desire the ability to quickly and accurately avoid the commercials in recorded programs, a feature was developed for VCRs that automated the identification and skipping of commercials. These VCRs use analog or digital video processing to identify events in the video signal that typically mark advertisements. Some of the events commonly identified include: blackfields (the frames of "blank" video that are inserted between commercials), silent fields (the "blank" audio that frequently accompanies blackfields), and abrupt volume changes (the volume increases that frequently accompany commercials). Unfortunately, these events may sometimes occur in program content, as well as in and around commercials.

Commercials are almost invariably presented in commercial groups that follow definable patterns. Blackfield and silent field events may separate each commercial in a commercial group. In order to overcome the limitations of identifying commercials based upon an isolated event, pattern-matching logic is used by the VCRs to identify the event patterns in commercial groups. Identified events are temporarily saved to a buffer. A series of events in the buffer are analyzed according to the spaces between them. If a predefined pattern is recognized, a commercial group is identified. Once a commercial group is identified, appropriate markers are recorded on the videocassette, usually written into the control track. During playback, a beginning marker initiates automatic fast-forwarding. The fast-forwarding continues until an end marker for the group is reached, at which time, the VCR returns to normal play mode. The advertisement skipping logic may also provide a video display, such as a blue screen, during the automatic fast-forwarding.

Commercial skipping VCRs have a number of shortcomings that reduce their usability and effectiveness. First, events may not be as simple to reliably detect as they first appear. Signal quality can radically impact the quality of blackfields and silence fields. The signal is rarely, if ever, actually zero. Additionally, many television networks and content providers have implemented watermarking or logos that appear even on blackfield screens. Delivery systems, networks, and content providers can all impact the quality of the blackfields and silence. There are other variations in the types of frames used to separate advertisements and program content, such as full screen logos and monochrome screens other than black. The variety and complexity of events is likely only to increase in a digital broadcast environment and may include proactive attempts by networks and advertisers to evade commercial detection. Improved methods of detecting events, such as blackfields and silent fields, are desirable.

Similarly, there is a great variation in the event patterns that may be used to identify commercial groups. Confusion with the scene pacing in a program may lead to false identification of commercial groups or portions of commercial groups, causing program content to be automatically skipped. In current implementations, commercial skipping logic does not even attempt to identify commercial groups near the beginning or ending of a program, where credits, teasers, and previews make it difficult to separate advertisements from program content. Event patterns may vary across networks, programs, and the time of day, week, or year. Event patterns may also evolve over time based upon changes in advertiser and viewer preferences. Event patterns are particularly susceptible to variation by the broadcast providers in order to avoid the pattern recognition logic of current systems. Improved methods of updating and executing pattern recognition logic are desirable.

DVRs are revolutionizing the way broadcast video content is stored, managed, and viewed. DVRs include systems for receiving, digitally storing, and playing back video content, such as video programs and commercials. DVRs generally use a digital storage media, such as a hard drive, for digitally storing compressed video content. While the video content is stored digitally, it is often received and played back as an analog signal-requiring one or more analog/digital converters. DVRs may provide a large number of enhancements for receiving, storing, and viewing video content, such as interactive program guides, interactive management of stored content, automated recording of new content, enhanced navigation features, file sharing and communications features, and other enhancements. Many of these enhanced features involve substantial data processing, memory, network, and graphical interface overlay capabilities. The combination of more flexible storage systems (e.g., digital file systems), enhanced processing power, and ubiquitous network technologies provides great potential for DVRs to overcome many of the limitations of VCRs.

Many DVRs include some functionality for avoiding commercials, such as a commercial skip feature that causes the DVR to move forward 30 seconds during playback or basic commercial detection during recording. However, these approaches, which often depend on the signal characteristics of a received broadcast, cable, or satellite signal, can be effected by geographical variance, distance from a transmission location, and variations among transmission providers. Additionally, content providers, may often adjust features such as commercial length and placement to respond to commercial detection techniques. What is needed is a method of dynamically updating the behavior of DVRs in response to signal variations and changes in commercial configurations.

SUMMARY OF THE INVENTION

The present invention provides for gathering, aggregating, and processing commercial navigation data to generate new instructions. It additionally provides for transmitting updated instructions to individual DVRs to improve commercial detection functionality.

Individual DVRs include functionality for recording broadcasted content in digital form and logging data that can be used to generate new recording instructions. The DVRs maintain a collection of modules and configuration files that guide it in commercial detection or other features. During its operation, a DVR gathers data that is relevant to the detection of commercials such as luminance values, commercial patterns, and user input and stores this information in its internal storage.

A central server includes functionality for aggregating DVR data, using the DVR data to generate updated instructions, transmitting relevant instructions to individual DVRs. The central server stores updated instructions which may be general or customized for individual DVRs. The central server receives updated instructions from administrators and generates new instructions in response to data aggregated from individual DVRs. These instructions include new algorithms and configuration values to be used by the DVR in its recording and commercial detection.

BRIEF DESCRIPTION OF THE DRAWINGS

These and other features of the invention's embodiments are more fully described below. Reference is made throughout the description to the accompanying drawings.

DETAILED DESCRIPTION OF THE INVENTION

In the following description, numerous details are set forth to further describe and explain one or more embodiments of the invention. These details include system configurations, block module diagrams, flowcharts, and accompanying written description. While these details are helpful to explain one or more embodiments of the invention, those skilled in the art will understand that these specific details are not required in order to practice the present invention.

Figure 1:
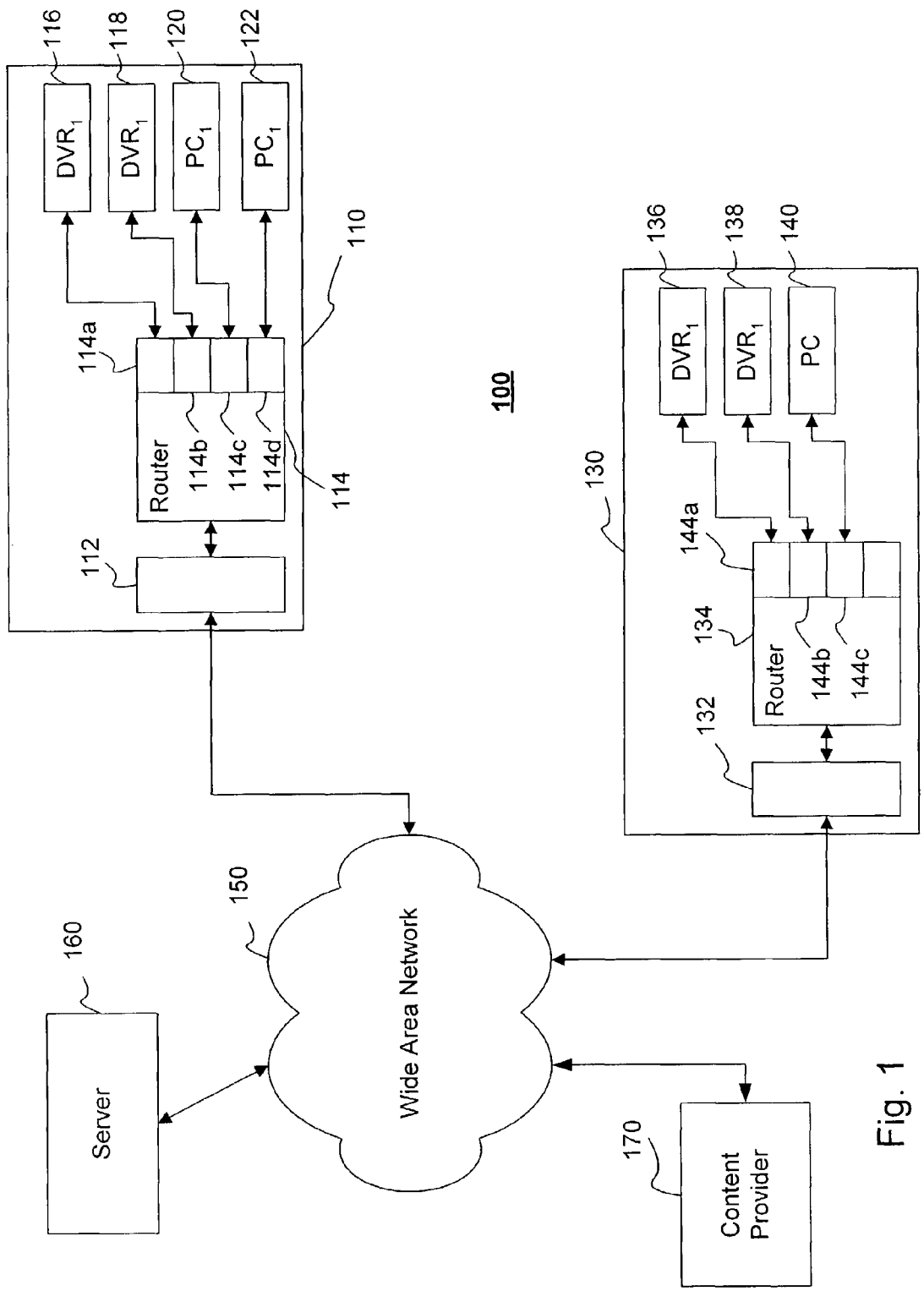
FIG. 1 is a schematic diagram illustrating an example of a system in which the embodiments of the invention may operate.

FIG. 1 illustrates an example of a system 100 in which several DVRs DVR 116, 118, 136, and 138 are interconnected in local area networks 110 and 130. The local area networks 110 and 130 are, in turn, connected to a wide area network 150. A server 160 and a content provider 170 are also connected to the wide area network 150. The wide area network 150 may be the Internet. Conventional networking technologies may be used to facilitate the communications among the various systems. For example, the network communications may implement the Transmission Control Protocol/Internet Protocol (TCP/IP), and additional conventional higher-level protocols, such as the Hyper Text Transfer Protocol (HTTP) or File Transfer Protocol (FTP). Connection of DVRs to communication networks may allow the connected DVRs to share recorded content, utilize centralized or decentralized data storage and processing, respond to control signals from remote locations, periodically update local resources, provide access to network content providers, or enable other functions.

In one embodiment, the local area networks 110 and 130 are home network systems for interconnecting a variety of home electronics devices. The local area networks 110 and 130 may include or be portions of a smart home network interconnecting a variety of appliances and home subsystems. In the embodiment shown, the local area network 110 includes the DVRs DVR 116 and 118, as well as PCs 120 and 122. Each of these units may be in a different location in the home and connected using conventional network technology and software. Communication among the units may allow remote operation and interchange between units. For example, the $DVR_1$ DVR 116 located in a bedroom may connect to the $DVR_2$ 118 located in the living room. The $DVR_1$ DVR 116 may access the guide information and stored video content of the $DVR_2$ 118. Similarly, the DVRs DVR 116 and 118 may share resources with and enable control from the PCs 120 and 122. The types and quantities of access and data shared among units may be limited to prevent circumvention of copyright management and other security features.

The local area network 110 also includes a router 114 and a broadband interface 112. The broadband interface 112 may be a conventional digital subscriber line (DSL) modem, cable modem, or any device providing an interface between the home network and a broadband connection, including wired, wireless and any alternative broadband connections. The router 114 acts as a firewall between the devices DVR 116-222 within the home network 110 and other devices potentially connecting with those devices through the Internet. Logical ports 114a-d are assigned for certain Internet communications made between the devices 116-122 and other devices outside the home network 110. These logical ports act as a barrier to certain file transfers.

Similar to local area network 110, the other shown local area network 130 includes a broadband interface 132 and router 134 through which units 136-140 may connect to each other and the Internet, using logical ports 144a-c. The local area network 130 may operate substantially as described above for local area network 110.

The server 160 may include any shared remote resource for data storage or processing that is accessible to multiple DVRs connected to the wide area network 150. The server 160 may facilitate communications among DVRs and other network resources, such as the content provider 170. In one embodiment, the server 160 is responsible for coordinating communications among DVRs and other network resources. For example, the server 160 may maintain content delivery information, including the network addresses and port information for various DVRs. The DVRs may periodically and automatically report their content delivery information to the server 160. Other DVRs may then contact the server 160 to receive the content delivery information. Communications between DVRs may be routed through the server 160 or may be made peer-to-peer using the content delivery information. Online content providers may query the server 160 for such information, which they may then use to complete content downloads.

The server 160 may be responsible for providing periodic updates of DVR software, guide data, service information, and other data. User specific event recognition and pattern recognition data, such as event thresholds and event patterns based upon user history, service, carrier, or program, may be provided in this manner. Similarly, new event types and event patterns may be provided to DVRs as they are developed. Software and graphical user interface driven navigation features may also be provided through the Server 160.

The server 160 may be responsible for receiving data from DVRs, storing and processing that information, and/or providing updated information back to the individual units. For example, the server 160 may collect usage data from DVRs on the network to provide aggregate program statistics and feature usage information. This function may also be used to collect event pattern data, analyze the data, and provide updated pattern matching algorithms for use by the DVRs.

The content provider 170 may include various services for delivering programming and advertising content through DVRs. For example, numerous websites produce original video content for download and viewing on a PC. Such video content may also be distributed through DVRs. As bandwidth and connectivity increase, more and more video content is likely to be distributed over wide area networks, such as the Internet. DVRs are particularly well suited to a content-on-demand distribution model. A user of the DVR 100 may use its enhanced navigation features to view recorded content with substantially reduced commercials.

Figure 2:
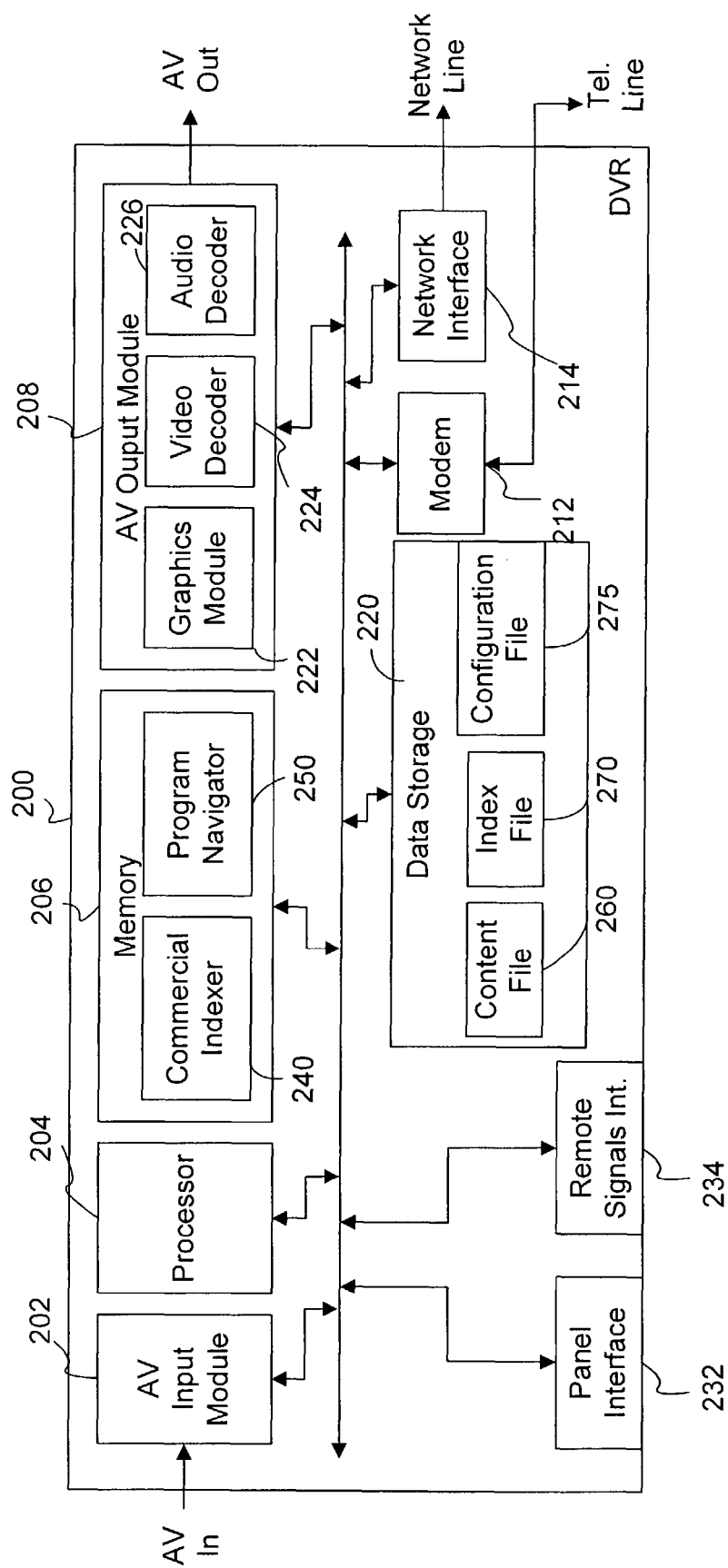
FIG. 2 is a block diagram illustrating a closer view of the DVR of FIG. 1.

The block diagram of FIG. 2 illustrates a closer view of the DVR 116 of FIG. 1. The DVR 116 includes an AV input module 202, a processor 204, a memory 206, an AV Output module 208, a data storage medium 210, a modem 212 and a network interface 214 interconnected by a conventional bus architecture. Generally, the processor 204 executes instructions such as those stored in the memory 208 to provide functionality including that provided by certain embodiments of the present invention. Additional memory such as ROM and/or EEPROM (not shown) may store instructions for boot up sequences, DVR functionality updates, or other information. The network interface 214 is conventional and preferably allows connection to an Ethernet based network. This connection may be used to connect to a home network and in turn a broadband connection to a WAN such as the Internet or any of various alternative broadband connections.

The user may control the operation of the DVR 116 through control signals provided on the exterior of the DVR 116 housing through the panel interface 232, or through control signals originating from a remote control, which are received through the remote signals interface 234, in conventional fashion. Other conventional electronic input devices may also be provided for enabling user input to DVR 116, such as a keyboard, touch screen, mouse, joy stick, or other device. These devices may be built into DVR 116 or associated hardware (e.g., a video display, audio system, etc.), be connected through conventional ports (e.g., serial connection, USB, etc.), or interface with a wireless signal receiver (e.g., infrared, Bluetooth™, 802.11b, etc.).

The AV input module 202 receives input through various conventional interfaces, including coaxial RF/Ant, S-Video, component audio/video, network interfaces, and others. The received signals can originate from standard NTSC broadcast, high definition (HDTV) broadcast, standard cable, digital cable, satellite, Internet, or other sources, with the AV input module 202 being configured to include appropriate conventional tuning and/or decoding functionality. The DVR 116 may also receive input from other devices, such as a set top box or a media player (e.g., VCR, DVD player, etc.). For example, a set top box might receive one signal format and outputs an NTSC signal or some other conventional format to the DVR 116. The functionality of a set top box, media player, or other device may be built into the same unit as the DVR 116 and share one or more resources with it.

The AV input module 202 also preferably includes one or more MPEG encoding modules that converts signals from a first format (e.g., analog NTSC format) into an MPEG format (e.g., MPEG 2, etc.) that may be stored in the memory 208 or the data storage medium 210 such as a hard disk. Typically, content corresponding to the formatted data stored in the data storage medium 210 may be viewed immediately, or at a later time. Additional information may be stored in association with the MPEG data to manage and identify the stored programs. Other embodiments may use other appropriate types of compression.

The AV output module 208 further includes a graphics module 222, video decoder 224 and audio decoder 226. The video decoder 224 and audio decoder 226 are preferably MPEG decoders that can obtain the MPEG data stored in the data storage medium 210 and convert it to format compatible with the display device, typically the NTSC format that can be readily received by a conventional television set. The graphics module 222 receives various guide and control information and provides signals for corresponding displays, outputting them in a compatible format.

The DVR 116 processes guide information that describes and allows navigation among content from a system (e.g., the broadcast system) at present or future times, as well as content that has already been captured by the DVR 116. Guides that display such information may generally be referred to as content guides. These content guides include channel guides and playback guides. A channel guide displays available content from which individual pieces of content may be selected for current or future recording and viewing. In a specific case, the channel guide may list numerous broadcast television programs, and the user may select one or more of the programs for recording. The playback guide displays content that is stored or immediately storable by the DVR 116. Other terminology may be used for the guides. For example, they may be referred to as programming guides or the like. The term content guide is intended to cover all of these alternatives.

The DVR 116 may also be referred to as a Personal Video Recorder (PVR). One example of a DVR 116 that may incorporate embodiments of the present invention is the ReplayTV brand of DVRs provided by SONICblue Incorporated, a Santa Clara, Calif. company. A Replay Guide is an example of a playback guide implemented by ReplayTV DVRs.

Although certain modular components of a DVR 116 are shown in FIG. 2, the present invention also contemplates and encompasses units having different features. For example, some devices may omit the telephone line modem, instead using alternative conduits to acquire guide data or other information used in practicing the present invention. Additionally, some devices may add features such as a conditional access module (CAM), such as one implementing smart card technology, which works in conjunction with certain content providers or broadcasters to restrict access to content.

Additionally, although this embodiment and other embodiments of the present invention are described in connection with a DVR or PVR, the invention is equally applicable to other devices including but not limited to a set top box (STB), cable STB, satellite STB, home media servers or televisions containing modules with similar functionality.

In the embodiment shown, the DVR memory 206 includes a commercial indexer 240 and a program navigator 250 and the data storage 210 includes at least one content file 260, one index file 270, and one configuration file 275. The commercial indexer 240, the program navigator 250, the content file 260, and the index file 270 may be used to provide enhanced navigation of video content during playback.

The commercial indexer 240 provides automatic detection of audio and/or video events in a video signal or data stream. For example, the detected events may correlate to transitions in the content of the video data, such as breaks between commercials and program content. Detected commercials may include any and all non-program content, such as paid advertising, station identification segments, previews, and other program interruptions. Commercials may be presented in sequential clusters, referred to as commercial groups, which are framed by program content. The commercial indexer 240 may detect events, analyze event patterns, and store data regarding identified transitions in content. The data stored regarding the identified transitions in content may then be used by the program navigator 250 to provide enhanced playback options, such as commercial skipping. Alternatively, the commercial indexer 240 may detect events and store the data regarding the detected events. During playback, the program navigator 250 may analyze event patterns and provide enhanced navigation options based upon the analysis. In one embodiment, event indexer 240 includes software instructions for coordinating video processing, pattern recognition, and data storage tasks. The commercial indexer 240 may govern hardware components for carrying out some aspects of the commercial detection tasks. In some systems, commercial detection may be integrated with A/D conversion, data compression, time indexing, and storage of the video data in data storage 210.

The program navigator 250 provides navigation options for viewing stored video content. The program navigator 250 may include functional logic mapped to the receipt of one or more control signals. For example, the program navigator 250 may determine, at least in part, how the DVR responds to user input through a remote control, panel interface, or other input device. Interpretation of received control signals may be conditioned based upon phases of operation, for example, during playback, from a guide or menu, etc. The program navigator 250 may include a graphical user interface, icon, audio cue, or other interface responsive to received control signals. The program navigator 250 may include various navigation features utilizing a time-based index of stored video content. In one embodiment, the program navigator 250 provides logic for skipping commercials in a recorded video program based upon events identified by the commercial indexer 240. The commercial skipping logic may be activated through a menu selection or a specified button on the panel interface 232 or remote control (not shown). The program navigator 250 may include logic for presenting brief edited portions of the skipped commercials and an icon or other indicator to notify the user that commercials are being skipped. Other content navigation options based upon the detected events might include: viewing commercials and skipping program content, jumping to the next or previous commercial or program segment, or "chapter" access to commercials and program segments.

The content file 260 includes the stored video data of one or more recorded video transmissions. The video data may or may not be stored in the same format in which it was received. For example, an analog video signal may be received by the DVR 116 and converted to a digital video signal and the digital data corresponding to the content of the digital video signal may be stored in the content file 260. In one embodiment, the digital data may be compressed using one or more video data compression techniques to economize use of the data storage 210. The content file may include a single recording session, which may or may not include multiple video programs and intervening commercials. In one embodiment, each content file corresponds to a single recorded video program and its intervening commercials.

The index file 270 includes pointers to a plurality of locations in the content file 260. The pointers index the stored video data at various locations to enable access to and navigation of the video data. For example, the index file 270 may include pointers for program start and end locations, evenly spaced pointers for providing a time-based index of the program content, or pointers corresponding to an event in video content, such as a blackfield, content change (e.g., from program to commercial), or other detectable content.

The configuration file 275 stores preferred algorithms and detection parameters for use by the commercial indexer 240. The configuration file stores parameters such as video and audio conditions, noise and luminance thresholds, that are specific to the user's location and broadcast provider, and blackfield configurations indicative of a commercial event. The configuration file can be periodically updated through communication with a remote server.

The DVR 116 may operate as a single home unit that is used in conjunction with a conventional television set, and that does not necessitate communication with other units. Alternatively, the DVR 116 may operate along with other units in various types of networks or the like.

Figure 3:
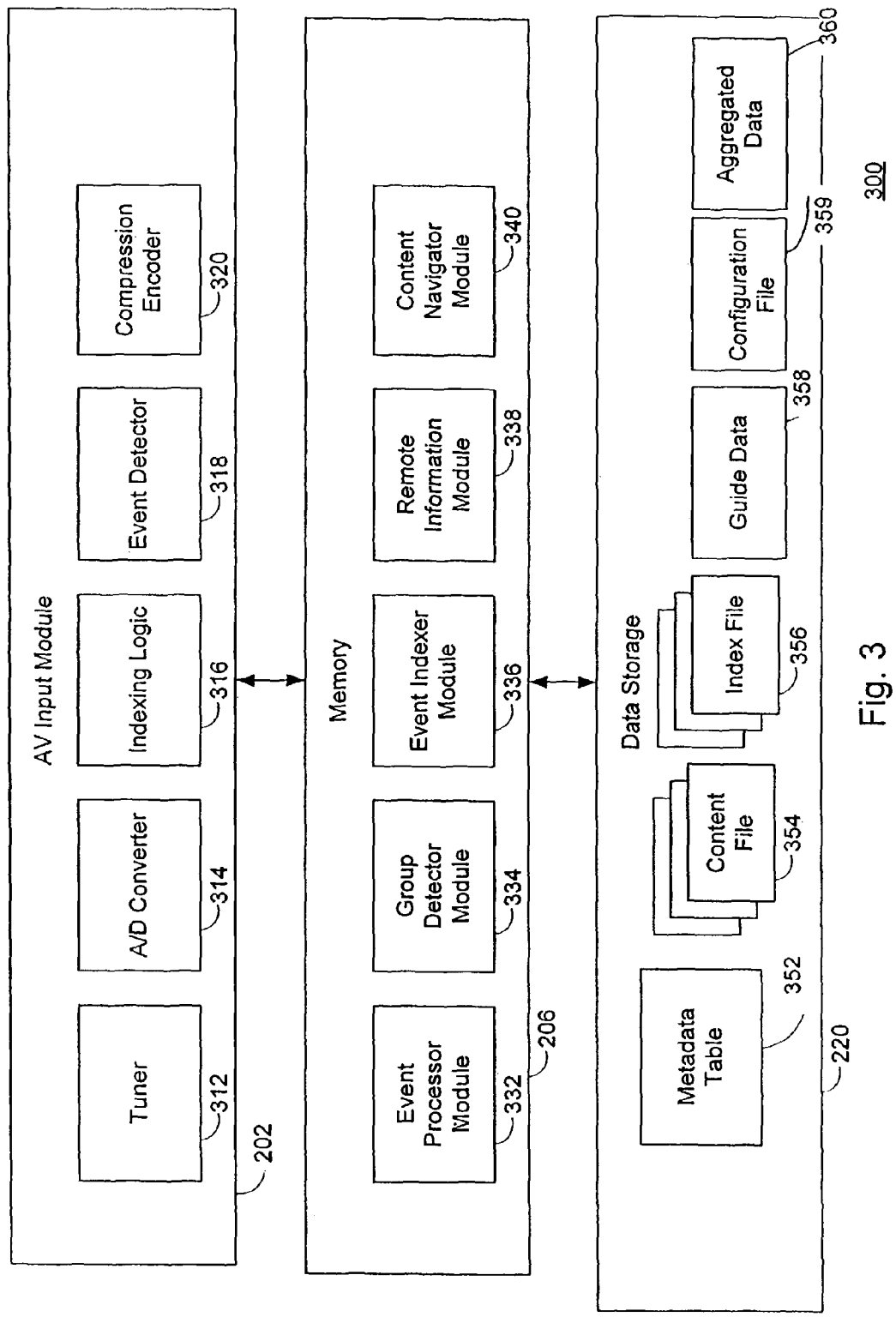
FIG. 3 is a block diagram illustrating a modular configuration of a DVR configured to send receive navigation information.

FIG. 3 illustrates a modular configuration 300 of a DVR configured to send and receive navigation information. Configuration 300 includes a plurality of functional modules organized within structures found in a typical DVR, such as DVR 100. The structures include an AV input module 202, a memory 206, and a data storage 220. The AV input module 202 includes hardware modules for receiving, processing, and redirecting data from a received signal. The memory 206 includes software modules for processing received data, selectively storing secondary data, and providing navigation of stored content. The data storage 220 includes files for storing content and other data used in the operation of the DVR. The software modules in the memory 206 may be loaded from the data storage 220 and may oversee the operation of both the AV input module 202 and the data storage 220.

The AV input module 202 receives an external signal, such as a broadcast signal, signal from another playback device, or packetized communication signal. The AV input module 202 directs content data corresponding to the content of the received signal to the data storage 220. The AV input module 202 may provide conversion, indexing, event detection, and compression based upon the received content data. In the embodiment shown, the AV input module includes a tuner 312, an A/D converter 314, indexing logic 316, an event detector 318, and a compression encoder 320.

The tuner 312 is a conventional tuner for selecting a signal or channel from a spectrum of available signals or channels. A tuner may be unnecessary where the data carrier consists of a single signal or channel.

The A/D converter 314 is a conventional A/D converter for converting analog signals into digital data corresponding to the video and other content of the analog signal. The digital data may be replicated to multiple other modules for simultaneous processing and storage. For example, event detection or other video processing may be carried out simultaneously with compression and storage of the video data. In alternate embodiments, video processing may be carried out on the analog signal before conversion. The A/D converter 314 may be obviated in systems where the video data is received in a digital format. The AV input module 202 may include any number of conversion modules for converting between conventional broadcast or communication signals and a digital format used within the DVR.

The indexing logic 316 is conventional logic for time indexing a digital video data stream. For example, the indexing logic 316 could generate a fixed size record containing the time of arrival of each Group Of Pictures (GOP) as each GOP is received. The record may also include the byte offset from the beginning of the content file, the size in bytes of the first frame of the GOP, and additional flags for marking events within the GOP. The resulting group of records may then be scanned to find the nearest GOP to a given time, thus providing a time index. In some embodiments, indexing logic 316 may be obviated by systems including pre-indexed video programs. For example, index data may be provided along with content data in a received data stream.

The event detector 318 provides detection of one or more types of events in the video data. For example, the event detector 318 may include a plurality of conventional detectors for calculating total video signal levels or total audio signal levels, or portions thereof. The event detector draws on algorithms and threshold values stored in a configuration file 359 when detecting video events. Some detectable events may be based upon content other than blackfields and silence. For example, events may be detected based upon video processing that identifies particular images, text, patterns, resolution changes and other commercial markers. Events may also be detected based upon audio processing that identifies sounds, audio drops, sound patterns, jingles and other commercial markers. The event detector 318 may carry out a detection algorithm for abstracting one or more values from the video data. The abstracted values may be processed or combined with other values before being passed or raising an indicator value (e.g., a flag) to another module for further processing. In some embodiments, event detection may not be necessary. For example, video programs may be broadcast with metadata indicating video events, content transitions, or other data useful for commercial detection and skipping.

The compression encoder 320 provides compression of the video data for storage in the data storage 220. The compression encoder 320 may include any system for removing redundant and unnecessary information from video data. The removal of such information decreases the amount of storage space and bandwidth that is required to store and communicate video images and sound. The compression encoder 320 may include conventional encoding logic for one or more data compression standards such as MPEG-1, MPEG-2, MPEG-4, H-261, H-263, and others. The compression encoder 320 may operate in conjunction with the A/D converter to compress the video data as it is generated from the analog video signal. The compression encoder 320 may operate in conjunction with the indexing logic 316 in order to correlate time to compressed video units. For example, an MPEG encoded data stream or file may include GOP headings that can be correlated to a time-based index by the indexing logic 316. In some embodiments, compression encoding may be unnecessary. For example, some systems may broadcast and share data already formatted with appropriate video compression.

The memory 206 contains executable software modules for overseeing operation of the commercial skip feature. The memory 206 may include one or more conventional RAM units connected through a bus architecture to a microprocessor, the AV input module 202, and the data storage 220. The memory 206 may oversee the operation of event detection, event group pattern detection, event indexing, updating event detection and navigation information, and providing navigation features based upon the event index. In the embodiment shown, the memory 206 includes an event processor module 332, a group detector module 334, an event indexer module 336, a remote information module 338, and a content navigation module 340. In alternate embodiments, one or more functions described in conjunction with the memory 206 may be carried out in a hardware module, remote system, or other system resource.

The event processor module 332 provides logic for handling events detected by the event detector 318. In one embodiment, the event processor module 332 receives one or more values describing an event detected by the event detector 318. For example, the event processor module 332 may receive an event flag, a luminance value, or a maximum and minimum audio value for a particular field, frame, GOP, or time point in the video data stream. The event processor module 332 may evaluate the received data to determine whether it meets threshold criteria for an event. The threshold criteria may include predefined values for both the event data and the event time. For example, the event processor module 332 may evaluate a plurality of received luminance values against a predefined threshold generated from a luminance histogram, but only if it falls within an event detection window that excludes the first and last two minutes of a recorded program. A detected event meeting the evaluation criteria of event processor module 332 is passed to the group detector module 334 for further analysis. In the alternative or in conjunction with being passed to the group detector module 334, the detected event may be passed to the event indexer module 336 to be stored for later analysis and use. In one embodiment, the event processor module 332 may evaluate a first type of event data, such as luminance, and provide instructions to the event detector 318 to capture event data for a second type, such as maximum audio, if certain conditions are met by the first type of event data. In an alternate embodiment, event data or other metadata may be provided with received video data. The event processor module 332 may provide logic for evaluating the received event data or other metadata to select events relevant to locating commercials in the video content.

The group detector module 334 provides pattern matching logic for evaluating a plurality of detected events. The group detection module 334 detects commercial groups based upon identifiable spacing patterns followed by commercial programmers. The group detection module 334 may receive a series of detected events from event processor module 332. In an alternate embodiment, the group detection module 334 may receive the detected events from the content navigation module 340 as it reads them from the index files 336 during playback. In one embodiment, the group detection module 334 saves received events to a temporary buffer for analysis. Alternatively, all detected events for a given program can be saved to a file location in the data storage 220 and analyzed from there. The group detection module 334 evaluates the series of detected events, or some portion thereof, against logical conditions for identifying a commercial group. For example, the group detection module may evaluate interval patterns between the occurrences of certain types of detected events. In an alternate embodiment, metadata identifying the nature of the video content may be provided with received video data. The group detection module 334 may select data relevant to locating commercial groups in the video content from the provided metadata. In yet another embodiment, the location of commercial groups may be downloaded directly from the Server 160, instead of being derived locally.

The event indexer module 336 provides the logic for writing an event index into the data storage 220. The event indexer module 336 receives one or more identifiers and corresponding file locations for those identifiers. For example, the event indexer module 336 may receive a first tag indicating a starting location for a commercial group and a second tag indicating an ending location for a commercial group. Other identifiers may include those corresponding to particular types of events (e.g., blackfield, silent frame, both, etc.), where multiple types of events may be detected by the event detector 318 and the event processor module 332. The event indexer module 336 may generate a data pointer indicating the nature of the location to be tagged (e.g., black field/silent frame event) and the corresponding location in a content file in the data storage 220. In one embodiment, the event indexer module 336 inserts the tag within a time-based index file associated with the particular content file. In an alternate embodiment, the event indexer module 336 inserts the tag and location in a separate event index. In some embodiments, the event indexer module 336 may be unnecessary. For example, the video programs within the system may be received with pre-generated commercial indices. Further description of an example event indexer module is provided below with regard to FIG. 6.

The remote information module 338 provides access to remote resources for enabling improved commercial skip functions. The remote information module 338 may include conventional network communication protocols for exchanging data with remote resources. For example, the remote information module 338 may utilize TCP/IP, HTTP, FTP, Ethernet, combinations thereof, or other protocols for communicating with remote servers or other units. The remote information module 338 may work in conjunction with one or more network adapters, modems, or other communication devices. The remote information module 338 may provide updated functions and data to other modules in the memory 206 and the data storage 220. For example, the remote information module 338 may periodically download updated detection schemes, threshold conditions, program logic, grouping logic, tags, index data, or new software modules. In one embodiment, the remote information module 338 periodically checks with a central server to determine if one or more new updates are available. If so, the update is downloaded and installed automatically on the DVR. For example, the remote information module 338 may periodically download updated audio and video threshold values for event detection and commercial group patterns for group detection. Additionally, the remote information module 338 can download the locations of commercial sequences within particular recorded programs and write them directly to the associated index for the program. The threshold values and commercial group patterns may be updated on the central server to reflect changes in content provider, broadcaster, and carrier signals and program formats. Threshold data and other quantitative information are typically stored by the remote information module 338 in the configuration file 359. Additionally, new algorithms to be utilized by the various modules can also be stored in the configuration file 359. Alternatively, the remote information module 358 can replace existing modules with new modules. The downloaded updates may be provided in conjunction with more general software and data updates for the DVR. In one embodiment, the remote information module 338 periodically uploads information stored in the aggregated data file 358.

The content navigator module 340 provides one or more navigation functions utilizing the event index data. For example, the content navigation module 340 may include a commercial skip function that operates during playback to: 1) recognize an event tag identifying the beginning of a commercial group; 2) identify the end of the commercial group; and 3) guide the data stream from the content file location corresponding to the first event tag to the content file location corresponding to the end of the commercial group. In some embodiments, the commercial skip function may locate the end of the commercial group based upon a second pointer included in the first index tag or may scan forward for a second index tag identifying the end of the commercial group. In some embodiments, the event tags may not directly correlate to the beginning or end of a commercial group: for example, when all events detected and processed through event processor module 332 are added to the event index. In these embodiments, the content navigation module 340 may select the first event tag and any subsequent tags for a preset period (e.g., 2 minutes). This group of event tags may be passed to the group detection module 334 for identification of the beginning and end of a commercial group. In one embodiment, the content navigation module 340 constantly buffers encountered event tags to the group detection module 334 during playback (when appropriate navigation features are enabled). The event tags may be buffered ahead of the actual playback stream to allow forward analysis of commercial groups. In one embodiment, all event tags for a video program are buffered for analysis when playback is initiated.

The content navigation module 340 may provide an indicator in order to notify the user that the commercial skip function has skipped commercial content. For example, the content navigation module 340 may play a small portion of one or more commercials in a skipped commercial group. The content navigation module 340 may provide an icon or other cue that indicates operation of the commercial skip function, such as an icon overlay, an audio cue, an LED or other indicator on the DVR control panel or remote control, or other indicator. The content navigation module 340 may map the functions it provides to particular user interfaces and control signals. For example, the content navigation module 340 may provide additional menu options in a graphical user interface for operation of the functions. The menu options may be provided through a conventional menu driven DVR GUI. In one embodiment, operation of one or more functions may be determined by a default setting that may be modified by the user through selection of appropriate menu options. Control signals for the functions enabled by the content navigation module 340 may be received through any of the conventional input devices for a DVR. In addition to menu navigation signals from a remote control or other input device, a custom remote control button for toggling one or more functions on and off may be included. Custom control panel buttons may be included in some embodiments.

The content navigation module 340 may include a variety of functions utilizing the commercial index. For example, the content navigation module 340 may provide a function for viewing only commercials. In one embodiment, the content navigation module 340 would locate the first commercial group index tag in a video program. The content navigation module 340 plays the commercial content until it reaches the end of the commercial group then skips to the beginning of the next commercial group. As with the commercial skip function described above, an appropriate indicator may be provided to the user. Access to the commercials only feature may be offered through a play menu or other interface and control signal options. Additional functions utilizing the commercial index are possible. Additionally, event index based features may be combined with time index based features in operation. For example, a commercial skip feature may be used in conjunction with fast forward, slow motion, instant replay, skip forward, reverse, etc.

The data storage 220 may include any conventional digital data storage device. For example, the data storage 220 may include a hard drive, removable media drive, RAM, M-RAM, optical storage system, or other data storage device. In one embodiment, the data storage 220 may include a plurality of such devices. The data storage 220 stores data using a digital file system that allows rapid, non-sequential access to the data stored therein. In the embodiment shown, the data storage 220 includes a metadata table 352, at least one content file 354, at least one index file 356, and a guide data file 358.

The metadata table 352 provides a variety of information regarding stored video programs. The metadata table 352 may be based on conventional data management technology for organizing information into interrelated records. In one embodiment, the metadata table 352 may include a plurality of interrelated tables based on conventional relational database technology. The metadata table 352 may be organized according to the programs presently stored or scheduled to be stored in the DVR. For example, the metadata table 352 may include row entries corresponding to each video program recorded or waiting to be recorded. Each row entry may include a variety of data columns describing the particular program. The metadata table 352 may include information to be used for selecting and organizing stored content. For example, the metadata table 352 may include program name, one or more categories, program description, rating information, running time, recording quality, source, date/time of recording, etc. The metadata table 352 may include information to be used by the system for accessing and playing each program. For example, the metadata table 352 may include the location of a corresponding content file, corresponding index file (time-based index file and/or commercial index file), a data pointer for where the last viewing left off, etc. The metadata table 352 may be created using a combination of system information and user input information. For example, storage details may be derived from system information, program information may be derived from guide data 358, and category information may be provided by the user.

The content files 354 include the video data corresponding to stored video programs. The content files 354 include image data, audio data, and system and synchronization data for the stored video programs. The content files 354 may include a plurality of files, each corresponding to a particular stored video program. Alternatively, the content files 354 may include a single file with multiple video programs stored within. The start and end locations of various programs may be recorded in a separate index, such as the index files 356 or the metadata table 352. The content files may be stored in a compressed digital format.

The index files 356 include index data corresponding to locations in the content files 354. The index files 356 may include a plurality of data pointers that correlate file locations in the content files 354 with information about corresponding program content. The index files 356 may include time-based index data, commercial index data, program begin/end/last viewed data, and other video data indexing. The index files 356 may include a plurality of files, each corresponding to an index for a particular stored video program. The index files 356 may include a single file with multiple indices for multiple stored video programs. The index files 356 may include multiple index file types with specific index information, such as separate time-based indices and commercial indices. The index files may include one or more tables correlating elapsed time, GOPs, and one or more tags indicating an event in the video content. In one embodiment, an index file includes a header indicating the index file format and records corresponding to each GOP in the content file. The GOP records may each include a byte offset to the header of the corresponding GOP within the content file, the time that the GOP was recorded, the time that has been omitted from the recording so far, the size in bytes of the first frame of the GOP, a count of consecutive following GOPs that are copy-protected, flags indicating the presence of copy protection (e.g., Macrovision, CGSMA, etc.), the offset from the header to the first frame within the GOP, and flags indicating the presence of an event within the GOP. Index data may be generated by the indexing logic 316 and the event indexer module 336 and stored in the index files 356. In some embodiments, some or all of the index data may be received with a broadcast or transfer of a video program.

The guide data 358 includes data describing broadcast or on-demand video programming available to the DVR. The guide data 358 may include program titles, times, and other descriptive data for past, present, and future programming. The guide data 358 may be accessed and navigated through a user interface to determine what to view and record. When a program is recorded, corresponding guide data may be transferred to accessible locations in the metadata table 352 or elsewhere. In one embodiment, the guide data 358 may include index data that is stored in the index files 356 for use by the content navigation module 340.

The aggregated data 360 includes information gathered by the DVR when recording and presenting video content. The aggregated data 360 includes luminance values stored by the compression encoder 320, audio levels and variances processed by the Event processor module 332, input logged by the panel interface 232 and remote signals interface 234, and logs of detected event patterns. User input can be logged in association with a watched program, and particular points in the watched program. This information is cross-referenced with an index file 356 so that the data can be matched with relevant points in a program. For example, if a user employs a predetermined number of 30 second skips in succession during a particular program, the identity of the program and the locations in the program where the skips occurred are stored in the aggregated data 360.

The configuration file 359 stores information for use by the event detector module 318, event processor module 332, and group detector module 334. The configuration file 359 stores threshold and average blackfield luminance and volume values. The configuration file 359 additionally stores updated algorithms for detection of commercial events that are utilized by the event detector module 318, event processor module 332, and group detector module 334.

Figure 4:
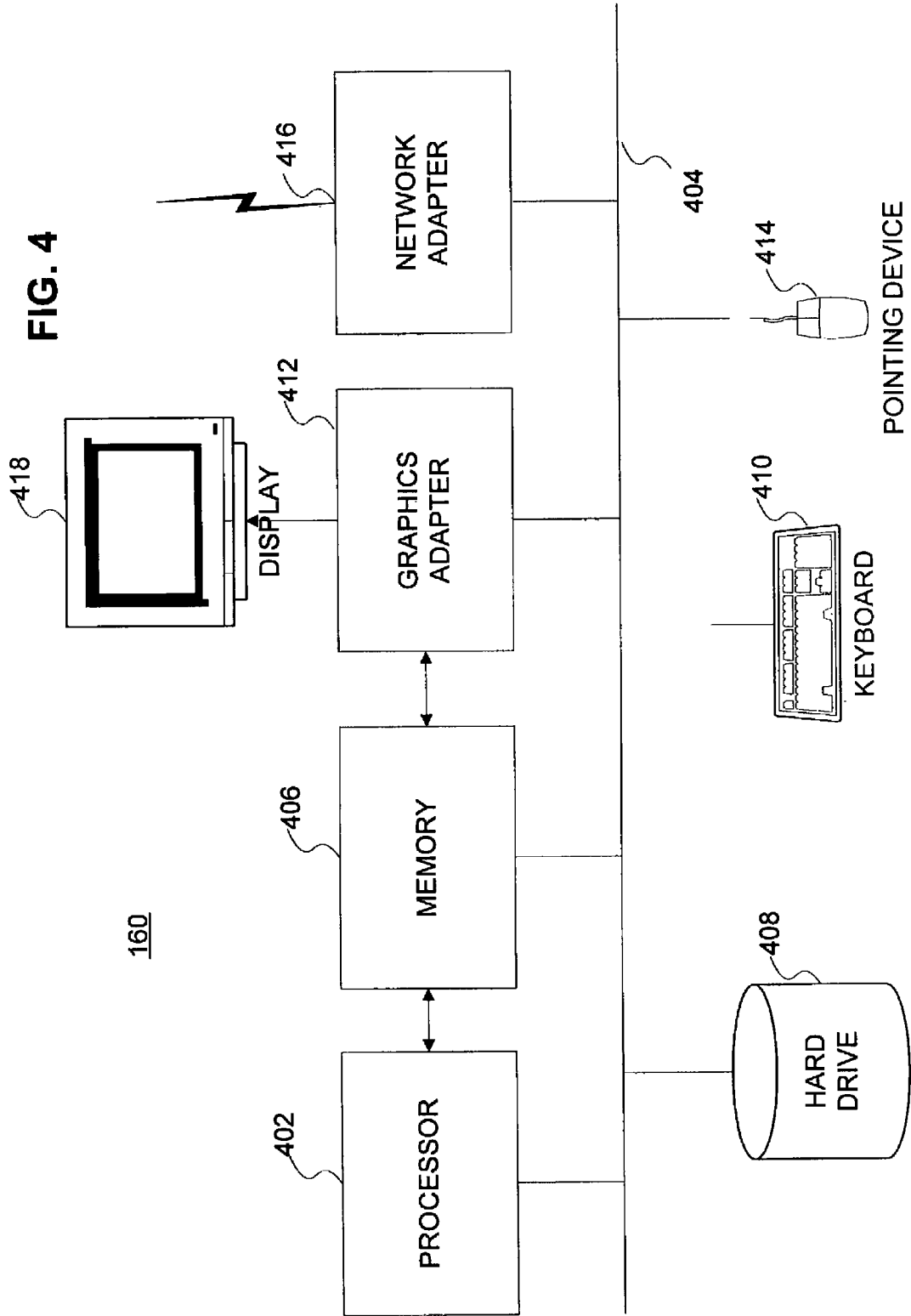
FIG. 4 is a high level block diagram illustrating a system to be used as a server.

FIG. 4 is a high level block diagram illustrating a system to be used as a server 160. Illustrated are at least one processor 402 coupled to a bus 404. Also coupled to the bus 404 are a memory 406, a storage device 408, a keyboard 410, a graphics adapter 412, a pointing device 414, and a network adapter 416. A display 418 is coupled to the graphics adapter 412.

The processor 402 may be any specific or general-purpose processor such as an INTEL x86 or POWERPC-compatible central processing unit (CPU). The storage device 408 may be any device capable of holding large amounts of data, such as a hard drive, compact disk read-only memory (CD-ROM), DVD, or some other form of fixed or removable storage device.

The memory 406 holds instructions and data used by the processor 402. The pointing device 414 may be a mouse, touch-sensitive display, or other type of pointing device and is used in combination with the keyboard 410 to input data into the server 400. The types of hardware and software within the server 400 may vary.

Figure 5:
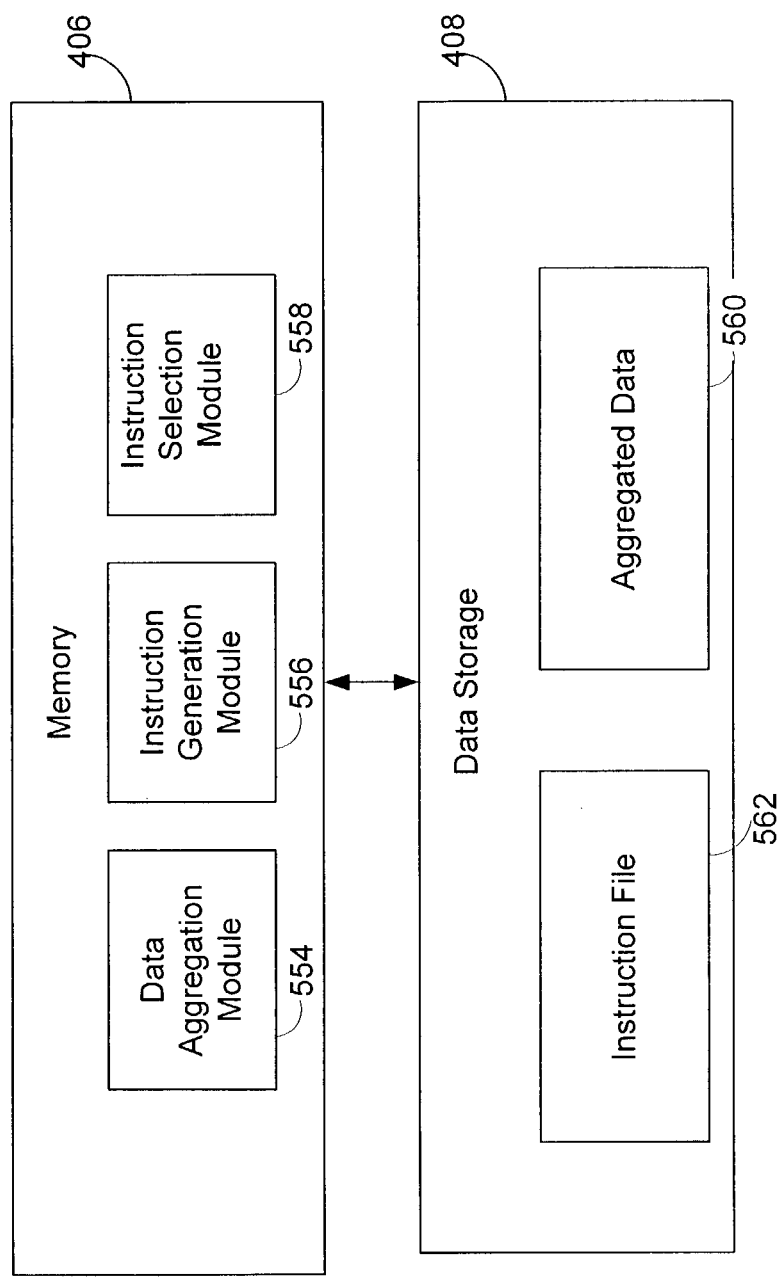
FIG. 5 is a block diagram illustrating a modular configuration of a server configured to transmit navigation information.

FIG. 5 shows a modular configuration 500 of a server 160 configured to transmit navigation information. The memory 406 interacts with the data storage 408 to receive navigation data from multiple DVRs and generate customized instructions.

The memory 406 includes a data aggregation module 554, an instruction generation module 556, and an instruction selection module 558. The data storage 554 includes an instruction file 562 and aggregated data 560. The data aggregation module 554 receives collected data from DVRs and stores it in the aggregated data 560. This information can include aggregated luminance information stored in the local data files of the individual DVRs, recorded instances of input suggesting commercial detection errors, usage logs and aggregated commercial pattern information. The data aggregation module 560 also receives information relating to the sending DVR such as its model, the owner's location, the type of television signal received(broadcast, cable, satellite, etc.), and the signal provider. The data aggregation module 554 stores this information in association with the commercial detection information.

The instruction generation module 556 processes the aggregated data 560 and generates a customized instruction file 562 that includes updated algorithms for remote DVRs. Typically, the instructions are organized by location, broadcast service provider, DVR model and any other relevant criteria. The instructions include preferred criteria to use when detecting commercials or other events. The instructions can include video and audio thresholds as well as commercial configurations. In one embodiment, the instruction generation module 556 receives average black field luminance values from a large number of DVRs with the same cable provider in the same city. The instruction generation module 556 determines an average blackfield luminance value for all users in the same area. This luminance value is stored as a base luminance value which is used as a threshold for future commercial detection. In an alternate embodiment, an administrator may develop new instructions and store them in the information file 562. These instructions may be developed independently of the information stored in the aggregated data 560.

The instruction generation module 556 can also generate instructions associated with particular programming. For example, if the aggregated data 560 contains a large number of instances where multiple 30 second skips occurred during a particular locations in a program, the instruction generation module 556 can determine that undetected commercials are stored at those locations and generate program specific instructions that will cause remote DVRs to skip the recorded content at those locations. Alternatively, the instruction generation module 556 can receive customized commercial location data from administrators and generate program specific instructions from this data. These locations can also be provided by an administrator, who, having received locations from individuals watching the programming, provides specific commercial locations within the broadcast. The generated instructions are stored in the instruction file 562.

The instruction selection module 558 receives instruction requests from the individual DVRs. The instruction selection module 558 determines the relevant characteristics of the DVRs and transmits customized instructions from the instruction file 562. Taking the previous example, the instruction selection module 558 receives an instruction request from a remote DVR. The instruction request includes identifying information about the requesting DVR. The instruction selection module 558 checks the instruction file 562 for an average blackfield luminance value for a DVR with same geographical, broadcaster, and channel characteristics and transmits the luminance value to the remote DVR 116. Alternatively, the instruction selection module 558 can scan the index files of a remote DVR to determine if the DVR contains any programming for which additional commercial location information is available. If this information is available, commercial avoidance algorithms associated with the relevant programming are transmitted to the remote DVR.

Figure 6:
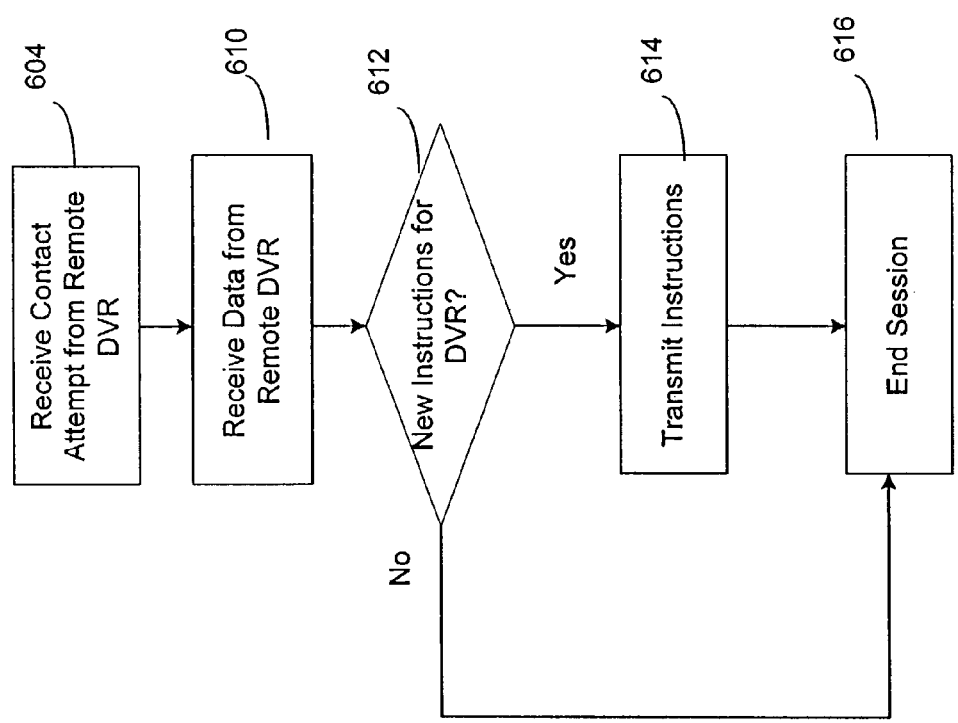
FIG. 6 is a flow chart illustrating a method of interacting with a remote DVR.

FIG. 6 illustrates a method of interacting with a remote DVR 116. A server 160 receives 604 a contact attempt from a remote DVR 116. In one embodiment this contact occurs when the DVR is first used by the consumer. In an alternate embodiment, the DVR 116 contacts the server 160 at regular intervals as part of a periodic update process. The server 160 receives 610 data from the remote DVR 116. This data includes information that identifies the DVR 116 and indicates its current situation such as a location, a broadcast provider, a distance from a cable transmission hub, a model number, and a unique identifier. The information additionally includes information logged by the DVR 116 to for the purposes of generating new instructions. Such logged information includes average blackfield luminance values, audio variances, logged user input and detected commercial patterns. The data aggregation module 554 stores the gathered data in the aggregated data 560.

The server 160 then determines 612 whether new information is available for the DVR 116. In one embodiment, the server 160 maintains a log of previous contacts and checks the instruction file 562 to determine if new instructions for the contacting DVR 116 have been developed since the last contact. If new instructions have been received since the last contact, the instruction selection module 558 reads the instruction file 562 and sends 614 the newest instructions adapted for the contacting DVR 116. In an alternate embodiment the DVR 116 transmits a version identifier indicating the most recent instructions received. If the server 160 determines that a newer instruction set is available, it transmits the newer instructions to the DVR 116.

The instructions can include a luminance value to be used as an average or baseline, audio or video features indicative of commercials, new commercial patterns and spacing, improved detection algorithms, and any other information relevant to the detection of commercials or the functioning of the DVR 116. The instructions can apply to the general functioning of the DVR 116 or be relevant to particular programming, such as the location of commercial groups in a particular television show. After transmitting the instructions, the server 160 ends the session.

Figure 7:
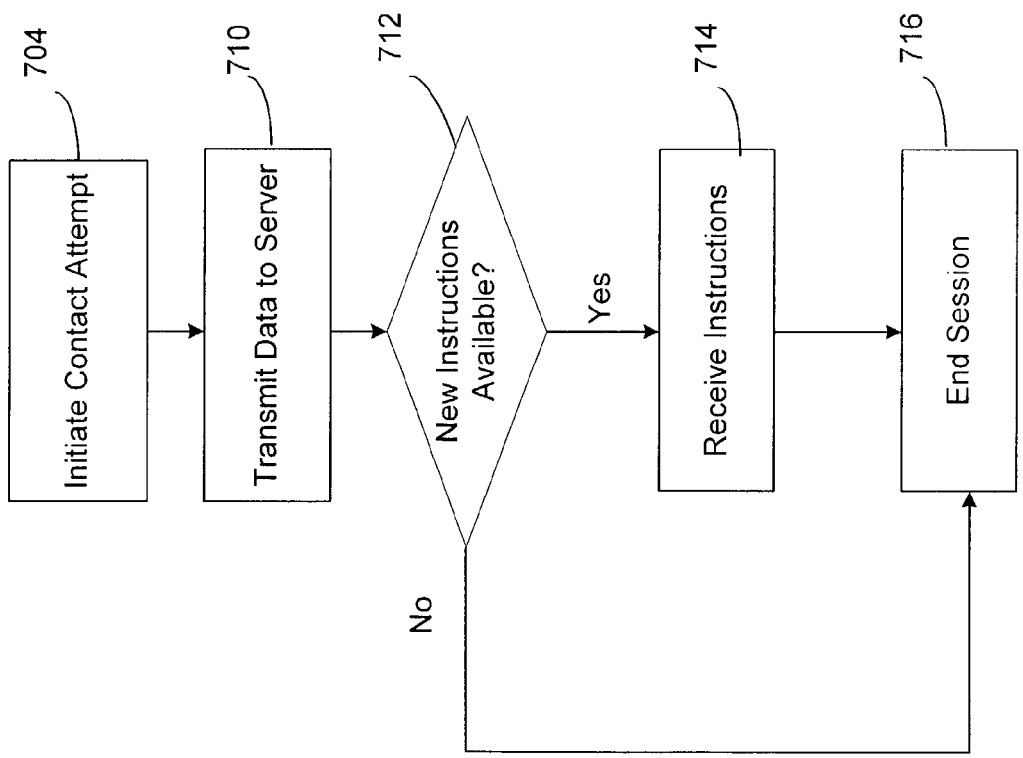
FIG. 7 a flow chart illustrating a method by which a DVR interacts with a remote server.

FIG. 7 illustrates a method by which a DVR 116 interacts with a remote server 160. The DVR 116 initiates 704 a contact with the remote server 160. In one embodiment this contact occurs when the DVR is first used by the consumer. In an alternate embodiment, the DVR 116 contacts the server 160 at regular intervals as part of a periodic update process.

The remote information module 338 of the DVR 116 transmits 710 gathered data to the server 160. This information is preferably stored in the aggregated data 360, but may also be taken from the index file 356 and content file 354. This data includes information that identifies the DVR 116 and indicates its current situation such as a location, a broadcast provider, a distance from a cable transmission hub, a model number, and a unique identifier. The information additionally includes information logged by the DVR 116 to for the purposes of generating new instructions. Such logged information includes average blackfield luminance values, logged user input and detected commercial patterns.

If new instructions are available 712, the DVR 116 receives 714 the new instructions from the remote server 160. The instructions can include a luminance value to be used as an average or baseline, audio or video features indicative of commercials, new commercial patterns and spacing, improved detection algorithms, and any other information relevant to the detection of commercials or the functioning of the DVR 116. After transmitting the instructions, the server 160 ends the session. The remote information module 338 updates the configuration file 359 in response to the instructions and additionally may replace or change the modules stored in memory 206 as provided by the transmitted instructions. The DVR 116 then ends 716 the session.

The invention claimed is:

1. A method, comprising:
    transmitting, from a particular digital video recorder, information for identifying the particular digital video recorder and for indicating a characteristic of broadcast content received by the particular digital video recorder, wherein the information includes:
        gathered information comprising average blackfield luminance value of a plurality of blackfield luminance values; and
        information indicating a geographical location within a particular geographical area, a broadcast provider associated with the particular digital video recorder, and channel characteristics of the particular digital video recorder;
    receiving, at the particular digital video recorder, one or more instructions selected based on matching the geographical area, broadcast provider, and channel characteristics of the particular digital video recorder, the one or more instructions configured to update a commercial detection function of the particular digital video recorder, wherein the one or more instructions configured to update the commercial detection function comprise one or more instructions for detecting commercials in broadcast content received by the particular digital video recorder and comprise instructions for using an average blackfield luminance value as a threshold blackfield luminance value for detecting commercials, and wherein the average blackfield luminance value is determined from a subset of a plurality of blackfield luminance values obtained from digital video recorders located in the same geographical area having the same broadcast provider associated with the particular digital video recorder;
    after receiving the one or more instructions, updating the commercial detection function of the particular digital video recorder based on the one or more instructions
    providing a user interface for mapping a plurality of control inputs to a plurality of navigation functions, wherein the plurality of control inputs comprise a commercial-skipping control input, and wherein the plurality of navigation functions comprise a commercial-skipping navigation function;
    receiving the commercial-skipping control input that is mapped to activate the commercial-skipping navigation function, wherein the commercial-skipping navigation function is configured to utilize the commercial detection function;
    detecting a commercial in the broadcast content received by the particular digital video recorder using the commercial detection function; and
    after detecting the commercial in the broadcast content and determining that the commercial-skipping function is activated, the particular digital video recorder:
        skipping the commercial during playback of the broadcast content received by the particular digital video recorder; and
        presenting an indicator that the commercial has been skipped.

2. The method of claim 1, wherein the commercial detection function of the particular digital video recorder comprises a commercial skipping function, and wherein skipping the commercial comprises skipping the commercial using the commercial skipping function.

3. The method of claim 2, wherein the one or more instructions comprise a base luminance value.

4. The method of claim 2, wherein the one or more instructions comprise commercial pattern information.

5. The method of claim 1, wherein the gathered information comprises user input to the particular digital video recorder.

6. The method of claim 1, wherein the gathered information comprises a pattern of commercials detected in the broadcast content received by the particular digital video recorder.

7. A method, comprising:
    receiving, at a server, gathered information comprising a plurality of blackfield luminance values from a plurality of geographical areas;
    determining, at the server, an average blackfield luminance value for each subset of the plurality of blackfield luminance values using the server, wherein each subset of the plurality of blackfield luminance values are blackfield luminance values received from digital video recorders located in the same geographical area having the same broadcast provider;
    receiving at a server, information for identifying a particular digital video recorder and for indicating a characteristic of broadcast content received by the particular digital video recorder, the information including geographical location within a particular geographical area, a broadcast provider associated with the particular digital video recorder, and channel characteristics of the particular digital video recorder;
    in response to receiving the information for identifying, the server selecting one or more instructions according to matching the geographical area, broadcast provider, and channel characteristics of the identified particular digital video recorder, the one or more instructions configured to update a commercial detection function of the particular digital video recorder, wherein the one or more instructions are customized for updating a commercial detection function for detecting commercials in broadcast content received by the identified particular digital video recorder and comprise instructions for using an average blackfield luminance value within the matching geographical area as a threshold blackfield luminance value for detecting commercials; and
    transmitting the one or more instructions from the server to the identified particular digital video recorder.

8. The method of claim 7, wherein the commercial detection function of the identified digital video recorder comprises a commercial skipping function.

9. The method of claim 7, wherein the one or more instructions comprise commercial pattern information.

10. The method of claim 9, wherein the gathered information comprises user input to the particular digital video recorder.

11. The method of claim 9, wherein the gathered information comprises a pattern of commercials detected in the broadcast content received by the identified digital video recorder.

12. The method of claim 7, wherein the information for identifying further indicates a broadcast carrier, which provides broadcast content to the digital video recorder.

13. A particular digital video recorder at a particular location comprising:
- a processor;
- an instruction set, the instruction set controlling a function of the particular digital video recorder;
- a non-transitory computer readable medium containing software therein, where the software, when executed by the processor, is configured to instruct the particular digital video recorder to perform functions comprising:
  - transmit information for identifying the particular digital video recorder and for indicating a characteristic of broadcast content received by the particular digital video recorder, wherein the information includes:
    - gathered information comprising average blackfield luminance value of a plurality of blackfield luminance values; and
    - information indicating a geographical location within a particular geographical area, a broadcast provider associated with the particular digital video recorder, and channel characteristics of the particular digital video recorder;
  - receive, at the particular digital video recorder, one or more instructions selected based on matching the geographical area, broadcast provider associated with the particular digital video recorder, and channel characteristics of the particular digital video recorder, wherein the one or more instructions configured to update the commercial detection function comprise one or more instructions for detecting commercials in broadcast content received by the particular digital video recorder and comprise instructions for using an average blackfield luminance value as a threshold blackfield luminance value for detecting commercials, wherein the average blackfield luminance value is determined from a plurality of blackfield luminance values, and wherein the average blackfield luminance value is determined from a subset of a plurality of blackfield luminance values obtained from digital video recorders located in the same geographical area having the same broadcast provider associated with the particular digital video recorder;
  - after receiving the one or more instructions, updating the commercial detection function of the particular digital video recorder based on the one or more instructions;
  - receive a control input to activate a commercial-skipping navigation function, where the commercial-skipping navigation function is configured to utilize the commercial detection function;
  - detect a commercial in the broadcast content received by the particular digital video recorder using the commercial detection function; and
  - after detecting the commercial in the broadcast content:
    - skipping the commercial during playback of the broadcast content received by the particular digital video recorder; and
    - presenting an indicator that the commercial has been skipped.

14. The digital video recorder of claim 13, wherein the commercial detection function of the digital video recorder comprises a commercial skipping function.

15. The digital video recorder of claim 14, wherein the one or more instructions comprise a base luminance value.

16. The digital video recorder of claim 14, wherein the one or more instructions comprise commercial pattern information.

17. The digital video recorder of claim 13, wherein the gathered information comprises user input to the digital video recorder.

18. A system for improving the performance of a particular digital video recorder comprising:
- a processor; and
- a non-transitory computer-readable storage medium having software stored thereon that, when executed by the processor, causes the processor to perform functions comprising:
  - a data aggregation function for receiving information for identifying the particular digital video recorder at a geographical location within a particular geographical area, a broadcast provider associated with the particular digital video recorder, and channel characteristics of the particular digital video recorder from a plurality of digital video recorders and store the information in data files and gathered information comprising a plurality of black field luminance values;
  - an instruction generation function for analyzing the data files, generating one or more instructions for the particular digital video recorder, and determining an average blackfield luminance value for each subset of the plurality of blackfield luminance values, wherein each subset of the plurality of blackfield luminance values are blackfield luminance values received from digital video recorders located in the same geographical area having the same broadcast provider associated with the particular digital video recorder, the generated instructions customized for updating a commercial detection function for detecting commercials in broadcast content received by the particular digital video, the generated instructions comprising instructions for using an average blackfield luminance value as a threshold blackfield luminance value within the particular geographical area for detecting commercials; and
  - a selection function selecting one or more instructions according to matching the geographical area, broadcast provider, and channel characteristics of the identified particular digital video recorder and for transmitting the one or more instructions to the particular digital video recorder.

19. The method of claim 1, wherein the indicator comprises an icon indicating that one or more commercials have been skipped.

* * * * *

UNITED STATES PATENT AND TRADEMARK OFFICE
CERTIFICATE OF CORRECTION

PATENT NO. : 8,752,115 B2  
APPLICATION NO. : 10/396230  
DATED : June 10, 2014  
INVENTOR(S) : Dow et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1513 days.

Signed and Sealed this  
Fourth Day of August, 2015

Michelle K. Lee  
*Director of the United States Patent and Trademark Office*